US011244565B2

(12) United States Patent
Arndt et al.

(10) Patent No.: US 11,244,565 B2
(45) Date of Patent: *Feb. 8, 2022

(54) METHOD AND SYSTEM FOR TRAFFIC BEHAVIOR DETECTION AND WARNINGS

(71) Applicant: BlackBerry Limited, Waterloo (CA)

(72) Inventors: Tyson Philip Arndt, Ottawa (CA); James Randolph Winter Lepp, Ottawa (CA); David Alexander Van Geyn, Ottawa (CA); Houffaneh Ali Osman, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,088

(22) Filed: Oct. 7, 2020

(65) Prior Publication Data

US 2021/0020042 A1 Jan. 21, 2021

Related U.S. Application Data

(63) Continuation of application No. 16/396,206, filed on Apr. 26, 2019, now Pat. No. 10,839,682.

(51) Int. Cl.
  *G08G 1/0965* (2006.01)
  *G08G 1/0967* (2006.01)
  *B60Q 9/00* (2006.01)
  *G08G 1/052* (2006.01)

(52) U.S. Cl.
  CPC .............. *G08G 1/0967* (2013.01); *B60Q 9/00* (2013.01); *G08G 1/052* (2013.01)

(58) Field of Classification Search
  USPC ....................................................... 340/905
  See application file for complete search history.

(56) References Cited

U.S. PATENT DOCUMENTS

| 9,129,460 | B2 | 9/2015 | McClellan et al. |
| 10,317,240 | B1* | 6/2019 | Di Pietro et al. ...... G06N 20/00 |
| 2012/0287278 | A1 | 11/2012 | Danis |
| 2016/0071418 | A1* | 3/2016 | Oshida ................ B60W 30/165 701/23 |
| 2016/0232785 | A1 | 8/2016 | Wang |
| 2017/0248950 | A1* | 8/2017 | Moran ................. G05D 1/0055 |
| 2017/0294117 | A1 | 10/2017 | Burke |
| 2018/0225963 | A1* | 8/2018 | Kobayashi ............... G08G 1/04 |

(Continued)

FOREIGN PATENT DOCUMENTS

| EP | 2887334 A1 | 6/2015 |
| EP | 3188151 A1 | 7/2017 |

(Continued)

OTHER PUBLICATIONS

Extended European Search Report, EP Application No. 20171219.7, dated Sep. 15, 2020.

(Continued)

*Primary Examiner* — Brent Swarthout
(74) *Attorney, Agent, or Firm* — Moffat & Co

(57) ABSTRACT

A method at a computing device associated with a road user, the method including detecting actions of a second road user; checking the actions against rules associated with the computing device; determining that the actions of the second road user contravene the rules; and providing a report regarding the actions of the second road user.

17 Claims, 10 Drawing Sheets

(56) References Cited

U.S. PATENT DOCUMENTS

| | | | |
|---|---|---|---|
| 2018/0293446 A1 | 10/2018 | Becker et al. | |
| 2019/0004179 A1* | 1/2019 | Hwang | H04W 64/00 |
| 2019/0088041 A1* | 3/2019 | Lee | H04W 4/12 |
| 2019/0385269 A1* | 12/2019 | Zachary | G07C 5/008 |
| 2020/0028688 A1* | 1/2020 | Takada | H04L 9/3247 |
| 2021/0020042 A1* | 1/2021 | Arndt | G08G 1/0141 |

FOREIGN PATENT DOCUMENTS

| | | |
|---|---|---|
| WO | 2017190794 A1 | 11/2017 |
| WO | 2018170883 A1 | 9/2018 |

OTHER PUBLICATIONS

ETSI, "Intelligent Transport Systems (ITS); Communications Architecture", EN 302 665, V1.1.1, Sep. 2010.

SAE, "On-Board System Requirements for LTE V2X V2V Safety Communications", J3161, Apr. 14, 2019.

\* cited by examiner

METHOD AND SYSTEM FOR TRAFFIC BEHAVIOR DETECTION AND WARNINGS

FIELD OF THE DISCLOSURE

The present disclosure relates to traffic management, and in particular relates to providing warnings based on a behavior of a vehicle.

BACKGROUND

Poor driving can create risks for other road users. Poor driving may involve any driving habit which creates a hazard, including speeding, weaving or excessive lane changes, driving under the influence of alcohol or drugs, driving excessively slowly, changing lanes without signaling, driving through stop signs or stop lights without stopping, among other similar habits.

Numerous parties may be affected by poor driving and would benefit from knowing about a vehicle that is being driven poorly. For example, insurance companies try to identify high risk drivers by having customers install devices in the vehicle or apps on mobile devices to capture driving habits. However, generally only good drivers opt to use these types of systems or technologies, and high risk drivers tend to avoid them.

Further, other road users would benefit from knowing about a poor driver. In the case of a driver who is excessively speeding, this may create a risk to drivers on the road. For example, a driver seeking to cross at an intersection may not appreciate the speed of an approaching vehicle. In other cases, a driver may pull into the same lane as a speeding driver, thereby potentially causing a rear end collision. Poor driving may also create other hazards to other users of the roadway or transportation system.

BRIEF DESCRIPTION OF THE DRAWINGS

The present disclosure will be better understood with reference to the drawings, in which.

DETAILED DESCRIPTION OF THE DRAWINGS

Figure 1:
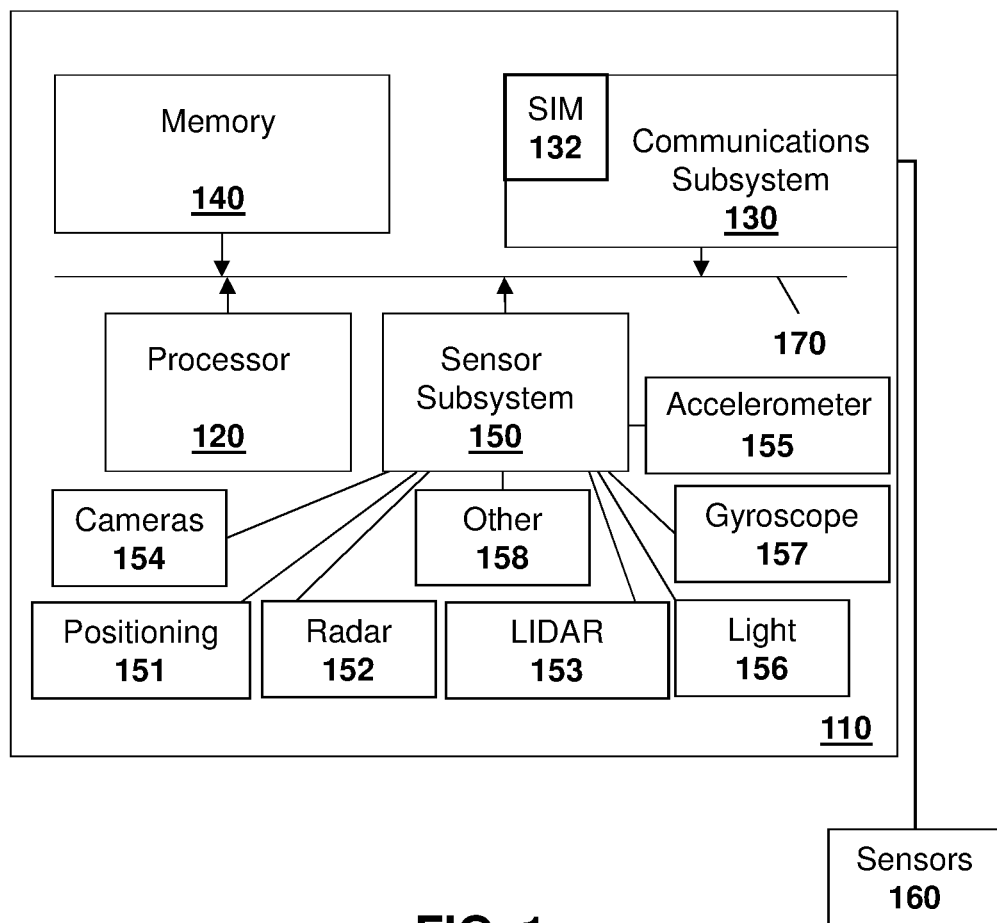
FIG. 1 is a block diagram of an example sensor apparatus capable of being used with the embodiments herein.

The present disclosure provides a method at a computing device associated with a road user, the method comprising: detecting actions of a second road user; checking the actions against rules associated with the computing device; determining that the actions of the second road user contravene the rules; and providing a report regarding the actions of the second road user.

The present disclosure further provides a computing device associated with a road user, the computing device comprising: a processor; and a communications subsystem, wherein the computing device is configured to: detect actions of a second road user; check the actions against rules associated with the computing device; determine that the actions of the second road user contravene the rules; and provide a report regarding the actions of the second road user.

The present disclosure further provides a computer readable medium for storing instruction code which, when executed on a processor of a computing device associated with a road user cause the computing device to: detect actions of a second road user; check the actions against rules associated with the computing device; determine that the actions of the second road user contravene the rules; and provide a report regarding the actions of the second road user.

Vehicles today may be equipped with the variety of sensors. For example, a vehicle may be equipped with a dash cam. In other cases, a vehicle may have other cameras, lidar, radar, among other similar sensors. Such sensors may, in the embodiments described herein, be used to capture and convey information about other road users. In some cases, the information may be conveyed to a central server such as a transportation management server, where the transportation management server could compile data from a plurality of sources and provide information to road users based on correlated data. In other cases, the information may be conveyed directly to other road users. In still further cases, information received from another road user may be forwarded to other road users. Such forwarding may include adding information observed at the forwarding vehicle in some cases.

Thus, in the embodiments of the present disclosure, sensor systems may be included on a vehicle. As used herein, the term vehicle can include any motorized vehicle such as a truck, tractor, car, boat, motorcycle, snow machine, among others, and can further include a trailer, shipping container or other such cargo moving container, whether attached to a motorized vehicle or not. Sensor systems may further be included at other road users, such as road side units, at computing devices associated with pedestrians, among other options.

In accordance with the embodiments described herein, a sensor apparatus may be any apparatus or computing device that is capable of providing data or information from sensors associated with the sensor apparatus to another transportation system user or to a central server. Sensors associated with the sensor apparatus may either be physically part of the sensor apparatus, for example a built-in global navigation satellite system (GNSS) chipset, or may be associated with the sensor apparatus through short range wired or wireless communications. For example, a LIDAR unit may provide information through a CANBUS or another type of network to the sensor apparatus. In other cases, a camera may be part of the sensor apparatus or may communicate with a sensor apparatus through wired or wireless technologies. Other examples of sensors are possible.

A central server may be any server or combination of servers that are remote from the sensor apparatus. The central server can receive data from a plurality of sensor apparatuses.

One sensor apparatus is shown with regard to FIG. 1. The sensor apparatus of FIG. 1 is however merely an example and other sensor apparatuses could equally be used in accordance with the embodiments of the present disclosure.

Reference is now made to FIG. 1, which shows an example sensor apparatus 110. Sensor apparatus 110 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows sensor apparatus 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

If communications subsystem 130 operates over a cellular connection, a subscriber identity module (SIM) 132 may be provided to allow such communication. SIM 132 may be a physical card or may be virtual. In some embodiments SIM 132 may also be referred to as a universal subscriber identity module (USIM), as merely an identity module (IM), or as an embedded Universal Integrated Circuit Card (eUICC), among other options.

Processor 120 generally controls the overall operation of the sensor apparatus 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, sensor apparatus 110 may access data or programmable logic from an external storage medium, for example through communications subsystem 130.

In the embodiment of FIG. 1, sensor apparatus 110 may utilize a plurality of sensors, which may either be part of sensor apparatus 110 in some embodiments or may communicate with sensor apparatus 110 in other embodiments. For internal sensors, processor 120 may receive input from a sensor subsystem 150.

Examples of sensors in the embodiment of FIG. 1 include a positioning sensor 151, a RADAR sensor 152, a LIDAR 153, one or more image sensors 154, accelerometer 155, light sensors 156, gyroscopic sensors 157, and other sensors 158. Other sensors may be any sensor that is capable of reading or obtaining data that may be useful for sensor apparatus 110. However, the sensors shown in the embodiment of FIG. 1 are merely examples, and in other embodiments different sensors or a subset of sensors shown in FIG. 1 may be used. For example, in one embodiment of the present disclosure, only an image sensor is provided.

If a positioning sensor is included, such positioning sensor may use a positioning subsystem such as a Global Navigation Satellite System (GNSS) receiver which may be, for example, a Global Positioning System (GPS) receiver (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLO-NASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating a device at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system Other sensors may be external to the sensor apparatus 110 and communicate with the sensor apparatus 110 through, for example, communications subsystem 130. Such other sensors are shown as sensors 160 and the embodiment of FIG. 1. For example, an image sensor may communicate over short range communications such as Bluetooth™ Low Energy with communications subsystem 130 on the sensor apparatus 110. Other examples of sensors 160 are possible.

Further, the sensor apparatus 110 of FIG. 1 may, in some embodiments, act as a gateway, and may communicate with other sensor apparatuses (not shown) on the vehicle, where the other sensor apparatuses may act as hubs for a subset of the sensors on the vehicle.

Communications between the various elements of sensor apparatus 110 may be through an internal bus 170 in one embodiment. However, other forms of communication are possible.

Sensor apparatus 110 may be affixed to any fixed or portable platform. For example, sensor apparatus 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, sensor apparatus 110 could be carried by a user.

Such sensor apparatus 110 may be a power limited device. For example, sensor apparatus 110 could be a battery operated device. Other limited power sources could include any limited power supply, such as a small generator or dynamo, a fuel cell, solar power, among other options.

In other embodiments, sensor apparatus 110 may utilize external power, for example from the engine of a vehicle, from a land power source for example on a plugged in recreational vehicle or from a building power supply, among other options.

External power may further allow for recharging of batteries to allow the sensor apparatus 110 to then operate in a power limited mode again. Recharging methods may also include other power sources, such as, but not limited to, solar, electromagnetic, acoustic or vibration charging.

Intelligent Transportation System

While a vehicle with a sensor apparatus 110 from FIG. 1 may communicate directly with a dedicated server or with other nearby vehicles, in some cases, such a vehicle may be part of an Intelligent Transportation System. Intelligent Transport Systems (ITS) are systems in which a plurality of devices communicate to allow for the transportation system to make better informed decisions with regard to transportation and traffic management, as well as allowing for safer and more coordinated decision-making. ITS components may be provided within vehicles, as part of the fixed infrastructure, such as on bridges or at intersections, and for other users of the transportation systems, including vulnerable road users such as pedestrians or bicyclists.

ITS deployment is receiving significant focus in many markets around the world, with radio frequency bands being allocated for the communications. In addition to the vehicle to vehicle communications for safety critical and non-critical applications, further enhancements to provide systems or applications are being developed for vehicle to infrastructure and vehicle to portable unit scenarios.

ITS software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from pedestrian or portable unit (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and/or avoidance, and allow a vehicle having a computing device that is part of the ITS to take action to avoid a collision, such as braking, steering, and/or accelerating. Autonomous vehicle may use such communications. In other cases, an active safety system on a vehicle may take input from sensors such as cameras, RADAR, LIDARr, and V2X, and may act on them by steering or braking, overriding or augmenting the actions of the human driver. Another type of advanced driver assistance system (ADAS) is a passive safety system that provides warning signals to a human driver to take actions. Both active and passive safety systems may take input from V2X and ITSs.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Figure 2:
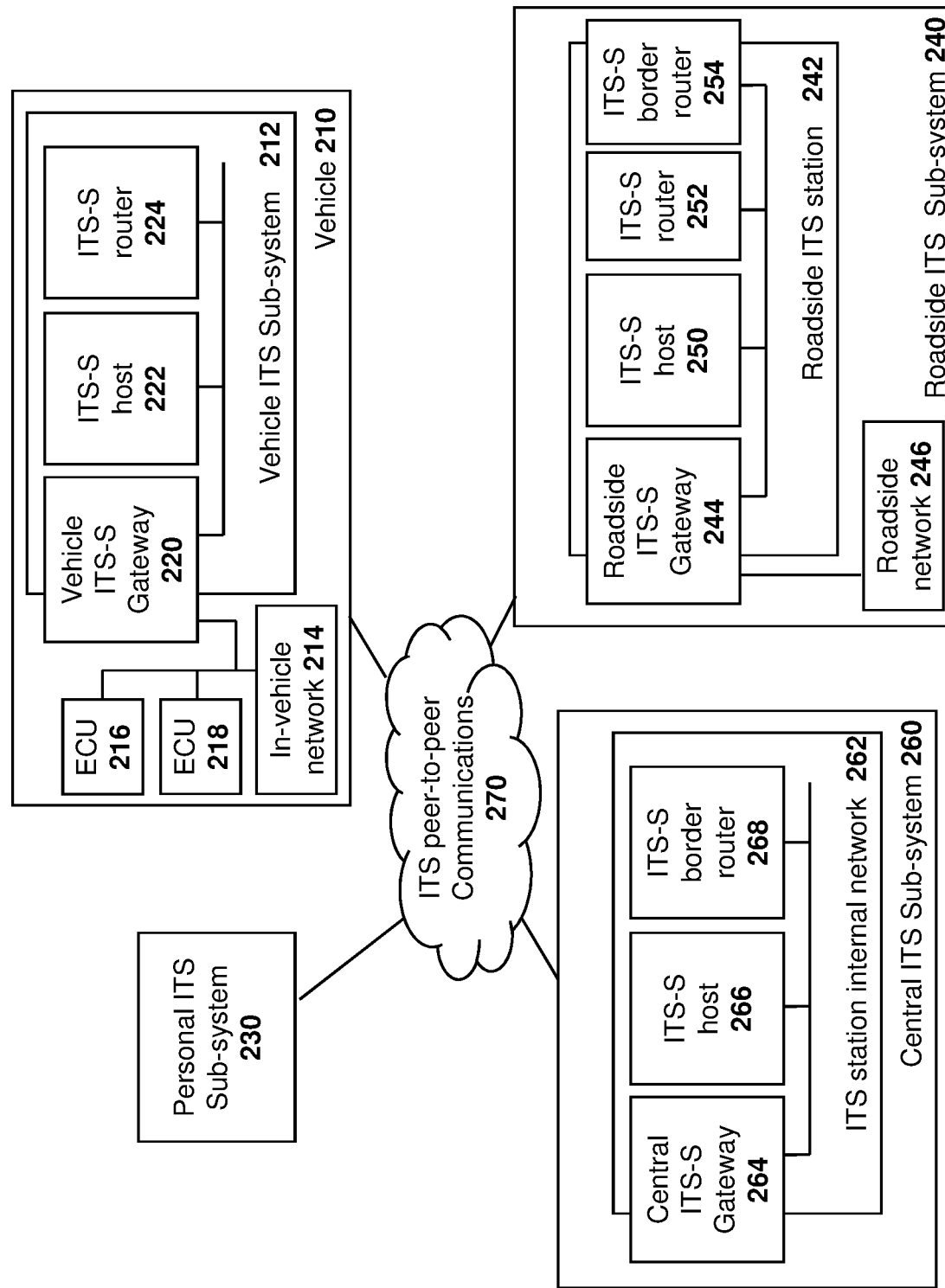
FIG. 2 is a block diagram of an intelligent transportation system.

Reference is now made to FIG. 2, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 2, a vehicle 210 includes a vehicle ITS sub-system 212. Vehicle ITS sub-system 212 may, in some cases, communicate with an in-vehicle network 214. The in-vehicle network 214 may receive inputs from various electronic control unit (ECUs) 216 or 218 in the environment of FIG. 2.

Vehicle ITS sub-system 212 may include a vehicle ITS Station (ITS-S) gateway 220 which provides functionality to connect to the in-vehicle network 214.

Vehicle ITS sub-system 212 may further have an ITS-S host 222 which contains ITS applications and functionality needed for such ITS applications.

Further, an ITS-S router 224 provides the functionality to interconnect different ITS protocol stacks, for example at layer 3. The ITS-S router 224 may be capable of converting protocols, for example for the ITS-S host 222.

Further, the ITS of FIG. 2 may include a personal ITS sub-system 230, which may provide application and communication functionalities of ITS communications (ITSC) in handheld or portable devices, such as personal digital assistants (PDAs), mobile phones, user equipment, among other such devices.

A further component of the ITS shown in the example of FIG. 2 includes a roadside ITS sub-system 240, which may contain roadside ITS stations and interceptors such as on bridges, traffic lights, among other options.

The roadside sub-system 240 includes a roadside ITS station 242 which includes a roadside ITS-S gateway 244. Such gateway may connect the roadside ITS station 242 with proprietary roadside networks 246.

A roadside ITS station may further include an ITS-S host 250 which contains ITS-S applications and the functionalities needed for such applications.

The roadside ITS station 242 may further include an ITS-S router 252, which provides the interconnection of different ITS protocol stacks, for example at layer 3.

The ITS station 242 may further include an ITS-S border router 254, which may provide for the interconnection of two protocol stacks, but in this case with an external network.

A further component of the ITS in the example of FIG. 2 includes a central ITS sub-system 260 which includes a central ITS station internal network 262.

Central ITS station internal network 262 includes a central ITS-S gateway 264, a central ITS-S host 266 and a ITS-S border router 268. ITS-S gateway 264, central ITS-S host 266 and ITS-S border router 268 have similar functionality to the gateway 244, ITS-S host 250 and ITS-S border router 254 of the roadside ITS station 242.

Communications between the various components may occur through a ITS peer-to-peer communications network 270.

The system of FIG. 2 is however merely one example of an ITS.

From FIG. 2 above, V2X communications may be used for road safety, for improving efficiency of road transportation, including movement of vehicles, reduced fuel consumption, among other factors, or for other information exchange.

V2X messages that are defined by the European Telecommunications Standards Institute (ETSI) fall into two categories, namely Cooperative Awareness Message (CAM) ($1^{st}$ message set) and Decentralized Environmental Notification Message (DENM) ($2^{nd}$ message set). A CAM message is a periodic, time triggered message which may provide status information to neighboring ITS stations. The broadcast is typically transported over a single hop and the status information may include one or more of a station type, position, speed, heading, among other options. Optional fields in a CAM message may include one or more of information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include one or more of details about the causing event, detection time, event position, event speed, heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message (BSM) is specified instead of, or in addition to, the CAM/DENM messaging.

Additionally, the types of messages sent over ETSI ITS-G5 radios or IEEE 802.11p radios may also be sent over cellular radios such as 3GPP LTE PC5 mode 4 links or 3GPP 5G NR V2X radios. See for example the Society of Automotive Engineers (SAE) J3161, "On-Board System Requirements for LTE V2X V2V Safety Communications", January 2012, which defines a system to send BSMs over Long Term Evolution (LTE) PC5 instead of IEEE 802.11p. 802.11p is also being upgraded to a newer 802.11bd standard. Collectively the 802.11-based, LTE-based or 5G-based radios are all considered V2X communication.

Road Side Units

RSUs can be used to send messages to traffic management operation centers so that actions can be taken upon specific events. Messages may provide information such as, for example, that an accident has occurred, that snow has fallen, that roadway maintenance is required, among other information. In accordance with some embodiments described herein, the messages may include information about vehicles behaving in an unsafe or potentially unsafe manner.

The trend toward connected cars and ITSs ensures that at least a subset of vehicles on the road have IP connectivity through cellular or possibly in other access technologies such as Wireless Local Area Network (WLAN). If a vehicle or other similar electronic device has IP connectivity (e.g. Internet connectivity) and a hazardous vehicle or road user is detected in an area where there are no RSUs, in accordance with some embodiments herein, the vehicle may transmit traffic information through the IP connection such as through the Internet or another dedicated IP network connection.

Figure 3:
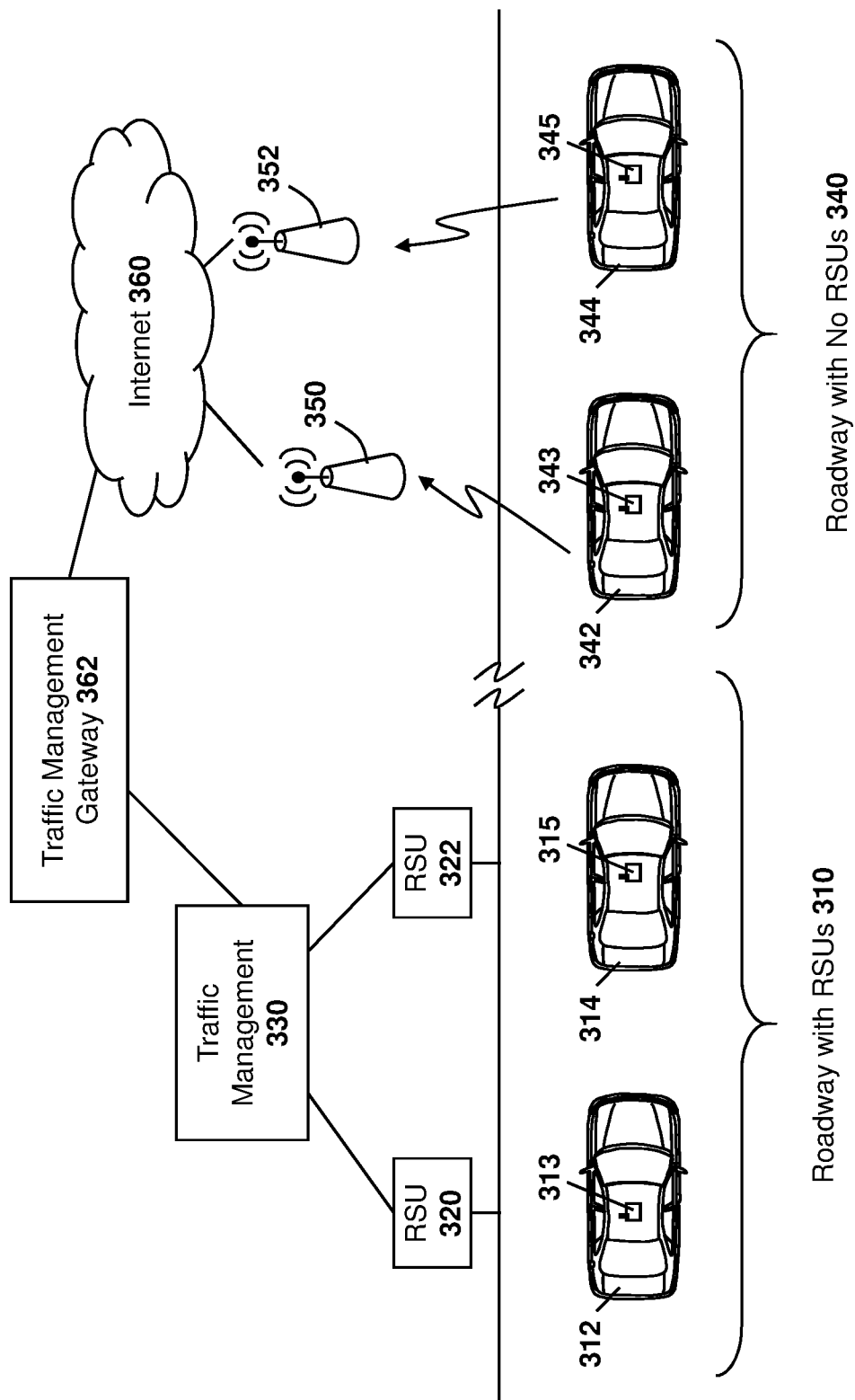
FIG. 3 is a block diagram showing a topology for communications with a traffic management entity for roadways with and without RSUs.

For example, reference is now made to FIG. 3, which shows an example network topology for traffic management. In the embodiment of FIG. 3, computing devices associated with vehicles provide traffic safety messages to a traffic management server.

When RSUs are available, RSU deployments are networked to provide information on traffic management through a traffic management application.

When RSUs are not available, a traffic management gateway is a network node which allows electronic devices to communicate with the traffic management application through an IP connection such as the Internet. The connectivity between the electronic device and the traffic management gateway could be through a cellular network or through another access network such as a Wi-Fi network, a Whitespace network, or any other network technology.

Thus, in the embodiment of FIG. 3, a roadway with RSUs 310 includes an vehicle 312 and vehicle 314. Each of vehicle 312 and vehicle 314 is equipped with a computing device, namely computing device 313 and 315 respectively, capable of providing messages to RSU 320 or RSU 322.

RSUs 220 and 222 communicate with a traffic management application 330, which is a network node used for traffic management.

Conversely, a roadway with no RSU 340 is shown having vehicles 342 and 344. As with vehicles 312 and 314, vehicles 342 and 344 each have a computing device 343 and 345 which is capable of sending messages. However, at least one of vehicles 342 and 344 is also capable of communicating with an IP network. For example, the communications may be between computing device 343 and/or computing device 345 with an access point 350 or a cellular tower 352 in some cases.

In accordance with the embodiments of the present disclosure, the communications may then be provided through a wide area network such as the Internet 360 as shown or another IP connection (e.g. dedicated IP network) and through a traffic management gateway 362 to the traffic management application 330.

In some cases computing device 343 or computing device 345 on vehicle 342 or vehicle 344 may act as a relay for vehicles that are not equipped to send IP messages. Further, in some cases computing device 343 or computing device 345 may act as a relay for communications from the other vehicle, even if that other vehicle or electronic device is capable of communicating through the IP network. For example, this may be done to limit the amount of IP traffic sent over the network by enabling only a subset of vehicles to act as RSUs.

Multi-Hop Signaling

Instead of, or in addition to, the use of the roadside units, in some cases a vehicle may communicate directly with other road users including other vehicles. Specifically, a vehicle may broadcast information about events that it observes to other vehicles. For example, utilizing DSRC communications, a vehicle may be able to communicate within a radius of approximately 2 miles or 3 km to inform other vehicles of events in ideal conditions.

In some cases, a vehicle may act as a relay and forward messages received from other vehicles to the vehicles in the vicinity.

Figure 4:
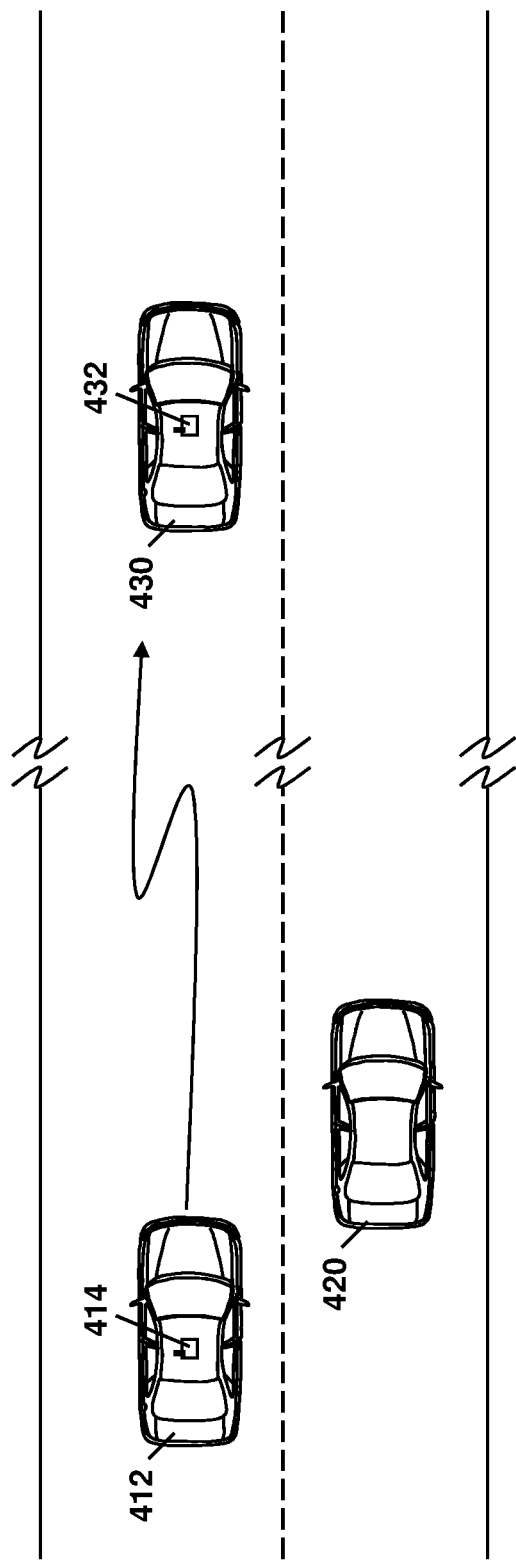
FIG. 4 is a block diagram showing a topology for communications directly between vehicles.

Therefore, reference is now made to FIG. 4. In the embodiment of FIG. 4, a vehicle 412 may include a computing device 414. In the example of FIG. 4, vehicle 412 may observe some aspect of the vehicle 420, such as erratic driving behavior as described below. In this regard, the computing device 414 on vehicle 412 may provide a communication to other vehicles, such as vehicle 430 which includes computing device 432.

Vehicle 430 may then process the information received from vehicle 412 and may perform a variety of actions. In some cases, vehicle 430 may performing evasive or safety maneuvers. In other cases, vehicle 430 may provide warnings to a driver. In still further cases, vehicle 430 may forward the message to other vehicles ahead of vehicle 430.

Erratic Behavior Detection and Reporting

In accordance with the embodiments described herein, a vehicle or other a road user may detect erratic behavior by another vehicle or road user, and report such erratic behavior. As used herein, erratic behavior may be any behavior that falls outside of the threshold norms. For example, erratic behavior may be considered to be driving at a speed in excess of a threshold over the speed limit. In other cases, erratic behavior may include crossing a lane marker more than a threshold number of times in a threshold time period. In other cases, erratic behavior may include failing to stop at lights or stop signs. In other cases, erratic behavior may be driving at a speed less than a defined speed below the speed limit. Other cases of erratic behavior would be apparent to those skilled in the art.

While the present disclosure discusses erratic behavior of other road users, in some cases, rather than the erratic behavior, reports may be focused on other hazards, including information such as traffic, potholes, road obstacles, or other environmental factors in addition to or instead of erratic behavior. The use of erratic behavior in the examples below is therefore only provided for illustration purposes.

The reporting of the behavior of a third party using the roadway may allow messaging to others, including other users of the roadway, third party information recipients such as the authorities or insurance companies, among others. If the recipient of such message is a user of the roadway, in some cases the user of the roadway may perform actions based on the information received in the messaging.

Figure 5:
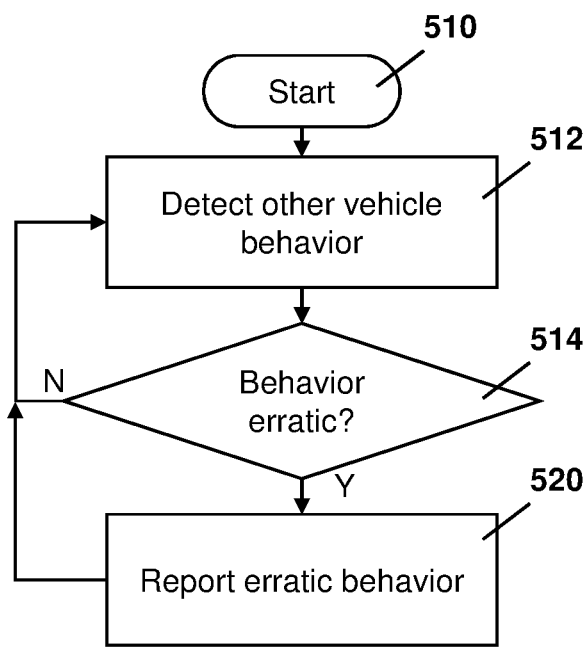
FIG. 5 is a process diagram showing a process at a road user for sensing erratic behavior of other road users.

Therefore, reference is now made to FIG. 5. The process of FIG. 5 starts at block 510 and proceeds to block 512 in which a road user may detect other vehicle behavior. The detection at block 512, may be accomplished, for example utilizing sensors such as those described above with regard to FIG. 1. Thus, for example, in one case a dash cam on a vehicle may detect another vehicle passing. Further, sensors on the vehicle may detect that the passing vehicle was driving at an excess speed. In some cases, the dash cam video of the vehicle passing may be stored for future messaging. In other cases, the dash cam video may be analyzed to obtain identifying information for the vehicle, such as a license plate number.

Other identifying information, such as make, color or other similar information may be noted by the sensing vehicle.

If the passing vehicle is part of an ITS system, identifying information may further include the BSM messages that the passing ITS vehicle is transmitting.

The detection at block 512 may look for specific behaviors, such as speeding, weaving, failure to obey traffic signals, among other such behaviors.

From block 512, the process proceeds to block 514 in which a check is made to determine whether the passing vehicle exhibited behavior that was deemed erratic. Thresholds and erratic behavior rules may be defined at the computing device associated with the sensing vehicle, and vehicle behavior of falling outside of the rules and thresholds may be deemed to be erratic. Thus, as described above, if the speed of the sensed vehicle is above or below a threshold from the speed limit, if the vehicle crosses a lane marker more than a defined number of times during a time period, if the vehicle fails to obey various traffic signals, among other options, the sensed vehicle may be considered to be driving erratically. The rules for erratic behavior detection may be provisioned to the sensing vehicle, for example during the manufacture of the sensing vehicle. In other cases, the rules may be propagated to the vehicle for example through a wireless communication system or during servicing of the sensing vehicle. For example, rules for speed limits may be part of a map in the vehicles memory which may be updated from time to time. The map of the speed limits may, for example, be pushed to the vehicle by an authorized entity such as a vehicle manufacturer, a municipality or other government agency, through a subscription that the vehicle has to a mapping service, among other options.

Further, in some cases, even if thresholds are met, mitigating factors may be investigated. For example, if a vehicle is seen to be weaving or to have swerved, in some cases there may be a legitimate reason for this behavior. For example, a pothole may exist on the roadway, an animal may have run onto the roadway, there may be a bicyclist or other obstruction in the roadway, among other similar factors.

In this case, the check at block 514 may determine whether or not there is a reason to justify the perceived erratic behavior. The check may involve utilizing sensors on the vehicle to look for a hazard or obstruction. For example, a camera, radar, lidar or other sensor may be used to detect potholes, animals, or other obstructions in the roadway which may explain the erratic behavior.

In other cases, the check may involve querying a server or having information from a server loaded to the vehicle. For example, a pothole report may be pushed to the vehicle and the check at block 514 may compare the position of the erratic behavior with that the position of potholes on the pothole report.

From block 514, if erratic behavior is not detected or the erratic behavior is justified based on detected obstacles, then the process proceeds back to block 512 in which the sensing vehicle continues to detect other roadway users. In some cases, a report with regard to the road obstacle may be made at this time to allow the network to know about potential obstructions in the roadway.

If erratic behavior (contravention of the rules) is detected at block 514, and cannot be justified, then the process proceeds to block 520 in which the erratic behavior may be reported. The reporting at block 520 may be made to the various parties. In one case, the reporting of the erratic behavior 520 may be made to other vehicles or a roadway users in the vicinity directly, for example as described with reference to FIG. 4. For example, a DENM or BSM message may be provided in accordance with ITS messaging. However in this case, the DENM or BSM message would contain information about the erratic behavior of the sensed vehicle. For example, the information may include one or more of: the type of erratic behavior; the location of the sensed vehicle, identifying information for the sensed vehicle; a direction of travel of the sensed vehicle; a rate of travel of the sensed vehicle; among other information.

Further, if the report of block 520 is sent to other vehicles, and the reporting message may be signed by the sensing vehicle. This would allow a receiving vehicle to verify the message. For example, the receiving vehicle could check that the certificate used to sign the reporting message is trusted, and additionally that it has not been revoked.

Figure 6:
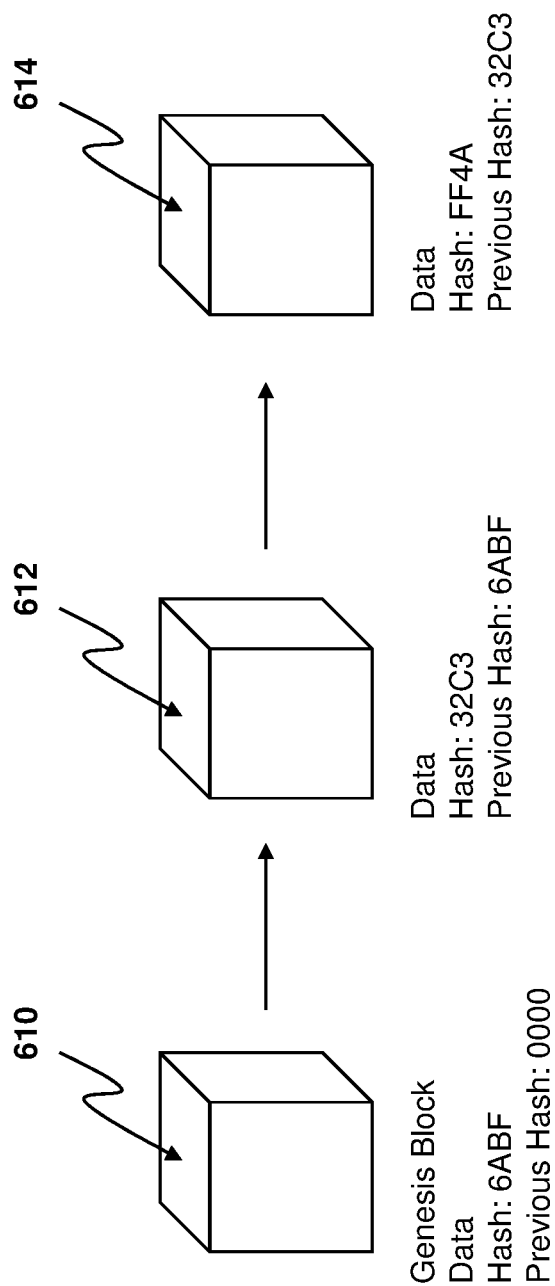
FIG. 6 is a block diagram showing an example simplified blockchain for communications between vehicles.

In other cases, the report of block 520 could be placed into a blockchain for security, tracing, and accountability of the report. For example, reference is now made to FIG. 6. In the embodiment of FIG. 6, a simplified blockchain is shown where, if the report at block 520 of FIG. 5 was an original report, then a "genesis block" would be created in which data could be sent to other vehicles. Such genesis block is shown as block 610 in the embodiment of FIG. 6. As seen at block 610, the block includes the data that is being forwarded, for example the erratic behavior of a specific vehicle. A hash for the block is also created. As will be appreciated by those skilled in the art, a hash typically is created utilizing a one-way function and is therefore uniquely associated with the block 610. As block 610 is the genesis block, no previous hash for blocks in the blockchain exists.

As described below, a vehicle could also receive data from another vehicle, in some cases add to it, and then forwarded the block to a further vehicle. In this case, the second vehicle may receive block 610, create block 612 and forward the block to a third vehicle. In this case, block 612 includes a hash of the block but also includes a previous hash to allow for tampering detection.

Similarly, block 614 includes data, a hash of the block, and a previous hash.

Further, in some cases, a distributed ledger can be used with the blockchain to further avoid tampering.

Figure 7:
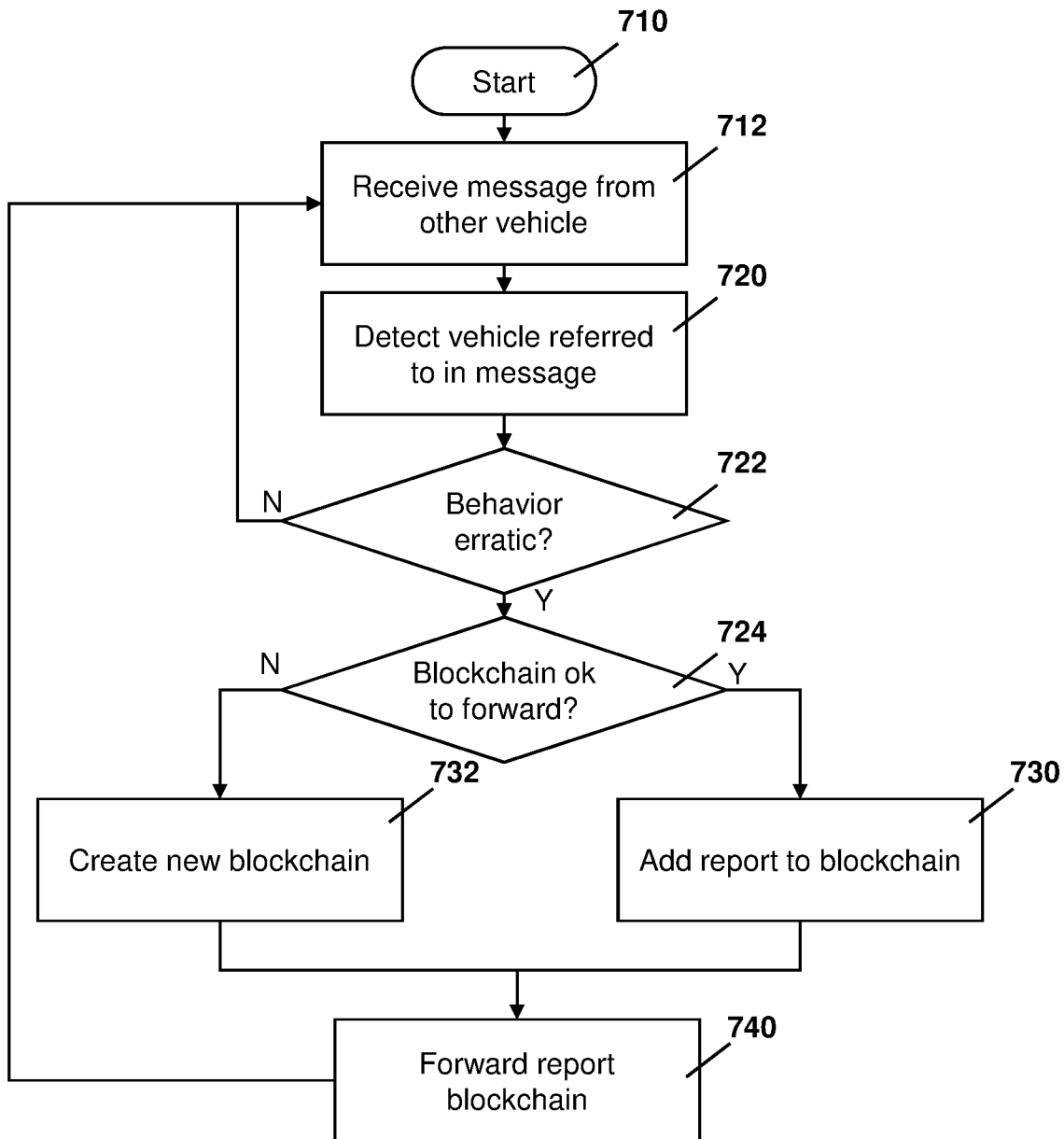
FIG. 7 is a process diagram showing a process at a vehicle for receiving a report in a blockchain and potentially adding to the report.

Utilizing blockchain, reports of the erratic behavior or reports of other road conditions may be sent through multiple hops. For example, reference is now made to FIG. 7. The process of FIG. 7 starts at block 710 and proceeds to block 712 in which a message is received from another vehicle. The message may include details about erratic behavior and the receiving vehicle may take appropriate actions based on the information within the message.

Further, in some cases, the receiving vehicle may also detect the vehicle identified in the report received at message 712. This is shown, for example, at block 720.

Based on the observations at block 720, the process may proceed to block 722 and may detect whether the vehicle is still acting erratically. The check at block 722 may be similar to that of block 514 from FIG. 5 above. If the vehicle is no longer acting erratically, in some cases, the process may proceed back to block 712 in order to continue to monitor further messaging. However, in other embodiments the fact that the vehicle is no longer acting erratically may be reported to one or both of other vehicles or to a server.

From block 722, if the vehicle is continuing to act erratically, the process may proceed to block 724 in which a check is made to determine whether the blockchain is okay to forward to other vehicles. For example, in order to save resources, it may be inefficient to forward messaging or blocks which are too large or contain messaging which is too old or too geographically separated from the current vehicle. In this case, it may be more efficient to discard the previous blockchain and start a new blockchain.

Therefore, from block 724, if the blockchain is okay to forward, the process may proceed to block 730 in which of the report of the erratic behavior or road conditions may be added to the current blockchain.

Conversely, if the blockchain needs to be restarted as determined at block 722, the process may proceed to block 732 in which a new blockchain is created. In some cases, rather than discarding the entire blockchain, mechanisms may exist to discard only those elements within the blockchain that fail to meet certain thresholds, such as time or distance thresholds.

From block 730 or block 732, the process proceeds to block 740 in which the reporting blockchain is then forwarded to other vehicles within the vicinity of the reporting vehicle.

Further, the forwarding may be done from block 740 to a server. Also, in some cases, if the blockchain is discarded at block 732, the old blockchain may be forwarded to a server for logging, tracking or other purposes.

From block 740, the process may proceed back to block 712 in order to monitor for other messaging.

In other cases, the forwarding of the blockchain may not be based on observing the subject erratic vehicle or road condition, but may rather be based on a geographic indicator in the original message. For example, if the message from block 712 indicates that the event occurred a threshold distance away from a defined a geographic area, then the receiving vehicle may make a determination that the information needs to be forwarded to other vehicles and therefore the determination at blocks 720 and 722 may be omitted. In this case, block 722 may determine whether the geographic threshold has been reached and if yes, then the process may proceed to block 724.

In other cases, rather than a geographic distance threshold, a number of hops threshold could be utilized for the check.

Other cases for determining whether to forward the blockchain could equally be utilized with the embodiments disclosed herein Referring again to FIG. 5, in other cases, the report at block 520 or block 740 may be sent to a server. For example, the server may be a traffic management agent as described in FIG. 3 above. In other cases, the server may be a server associated with law enforcement or may be a server associated with insurance companies, among other options. In this case, the report may contain information including any one or more of: the type of erratic behavior sensed; identifying information for the sensed vehicle; video or pictures of the sensed event; a location of the sensed vehicle; a direction of travel of the sensed vehicle; a rate of travel of the sensed vehicle; among other information.

From block 520 the process proceeds back to block 512 in which the sensing vehicle or a road user may continue to monitor and detect the behavior of other road users.

While the embodiment of FIG. 5 is described above with regard to a vehicle performing the sensing, it will be appreciated by those skilled in the art that other entities could be doing the sensing. In particular, the sensing could be performed by a roadside unit, a pedestrian with a mobile device; or other road user in which a sensing apparatus such as that described with regard to FIG. 1 is included with that road user.

Figure 8:
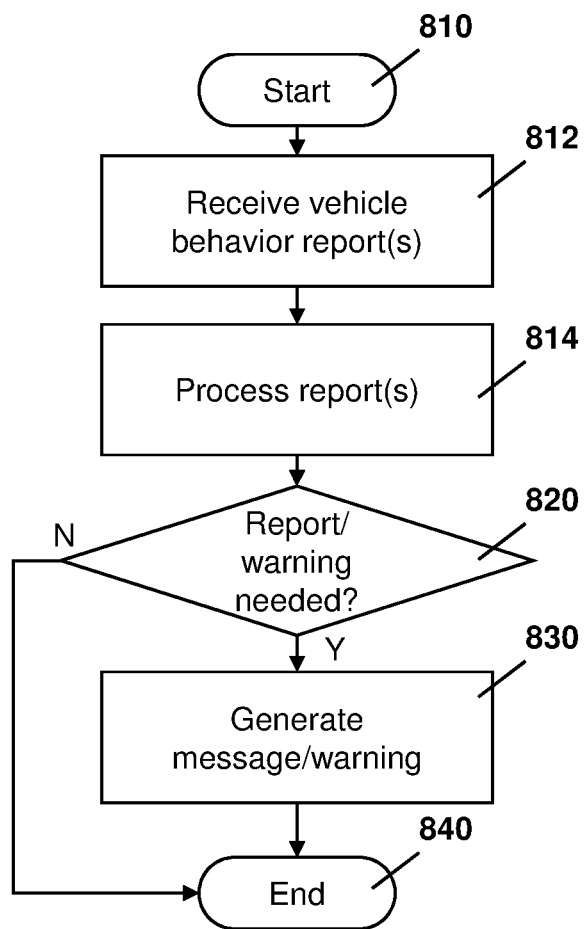
FIG. 8 is a process diagram showing a process at a server for receiving one or more vehicle behavior reports and providing messages or warnings as needed.

If the report at block 520 is sent to a server, the server may then process the report. For example, reference is now made to FIG. 8. The process of FIG. 8 starts at block 810 and proceeds to block 812 in which the server may receive one or more vehicle behavior reports. In some cases the reports may include a blockchain of a plurality of reports.

The process then proceeds to block 814 in which the reports may be processed. For example, the server may look for identifying information about the sensed vehicle and correlate reports from different entities. The correlation of the reports may provide a higher confidence level in the erratic behavior of the sensed vehicle, for example.

From block 814, the process proceeds to block 820 in which a check is made to determine whether a report or warning is needed to be provided. For example, in some cases correlation of a determined number of reports may be needed prior to the generation of a warning. In this case, if the determined number of reports about the erratic behavior have been received, then the process may proceed from block 820 to block 830 in which a warning message may be provided. For example, the warning message may be a message to road users within the vicinity or geographic area of the sensed erratic driver. The size of the region for which to generate the reports and may be defined at the server based on the behavior reported in some cases. Further, the size the region in some cases may be predetermined and the location of the sensed vehicle may be used to define the road users to which the message or report is sent.

In some cases, the report at block 830 may also (or instead) be sent to third parties, including insurance companies, authorities, among others. The report at block 830 may contain any video or still pictures that were received in the reports received at block 812. Further, correlation data may be provided in the message at block 830 to provide further proof of the erratic behavior.

If a report or warning is not needed as determined at block 820, or after the report has been sent at block 830, the process may proceed to block 840 and end.

A road user may receive a report, either directly from the sensing road user or from a server, indicating that a vehicle or other road user is behaving erratically. The receiving road user may then perform actions to mitigate risks or dangers associated with the erratic behavior.

Figure 9:
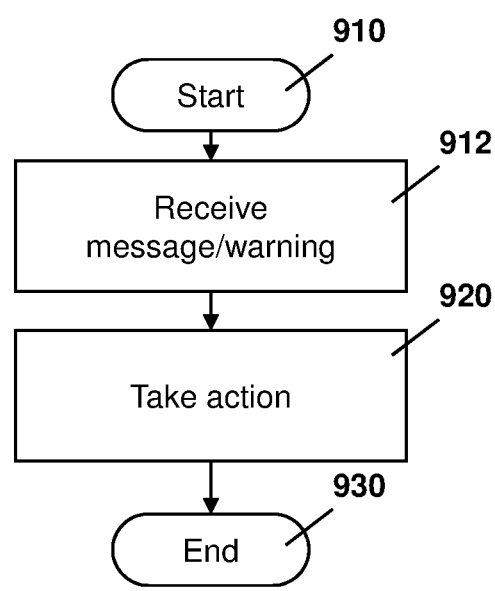
FIG. 9 is a process diagram at a third road user receiving messages or reports about erratic behavior and performing an action based on the reports.

For example, reference is now made to FIG. 9. In the embodiment of FIG. 9 the process starts at block 910 and proceeds to block 912 in which a message or warning is received by the road user. For example, the message or warning may be the report provided at block 520 of FIG. 5, from block 740 of FIG. 7, or the message generated and sent at block 830 of FIG. 8.

The message received at block 912 may include information including the type of erratic behavior sensed or road hazard sensed, the direction and speed of the vehicle or road user, identifying information about the erratic vehicle, among other information. If the message includes a blockchain, information from multiple vehicles may be included in the report. This may allow the receiving vehicle to gain more confidence with the contents of the report by showing that multiple vehicles sensed the same thing, and that the report is therefore not based on faulty sensors or on malicious actors. Similarly, a warning from a server may include a confidence level based on correlation at the server, and this may also be considered by the receiving vehicle.

The process then proceeds to block 920 in which the receiving road user may take an appropriate action based on the received information. An appropriate action may, in some cases, include pulling over to the side of the road to allow the erratic vehicle to pass. In other cases, the appropriate action may be to change lanes. In other cases, the appropriate action may be to avoid changing lanes. For example, if a report is received at that a sensed vehicle is approaching at a high rate of speed, then an appropriate action may be to avoid moving into a fast lane where the sensed vehicle is approaching from.

The action at block 920, may include providing warnings to road users to take the appropriate action. In this case, for example, a dashboard message may be provided indicating that a hazardous situation exists, similar to current warnings about lane changes in today's vehicles. In other cases, the action may be done automatically by, for example, moving the vehicle to the shoulder or changing lanes. This may be done in active collision avoidance systems of manned vehicles or if the road user is an autonomous vehicle.

In other cases, if the road user receiving the message is a police vehicle, the appropriate action may be to provide directions to the location of the erratic vehicle.

Other actions may be appropriate and would be apparent to those skilled in the art having regard to the above.

Further, the action of the road user may be determined by the confidence of the road user in the information received. For example, a confidence threshold may be required to be met before a particular action is taken by the road user. A plurality of thresholds may exist at the computing device associated with the road user and various actions may require different threshold levels. For example, the confidence level needed for forwarding a message may be lower than a confidence level needed for taking an evasive action. Therefore, the action performed at block 920 may require a confidence threshold to the met.

The confidence level may be calculated based on information within the report. For example, the information in the report received at block 912 may include the types of sensors that were used to find the information. Certain types of sensors may be given more weight than other types of sensors. Further, if the report included a blockchain with multiple vehicles reporting, this may be indicated in the confidence level derived at the receiving vehicle. Based on this, a confidence level may be derived in real-time based on information within the received report.

For example, in each vehicle, various sensor types may be given a weighting. A plurality of sensor reports may allow the adding of the various weighted scores. If more than one vehicle is providing the report then the scores from each reporting vehicle can be added. Such scores can then be checked against a defined threshold level for each action type.

Further, a confidence level may be provided by a server that has performed correlation on the event.

Other ways to determine a confidence level would be apparent to those skilled in the art having regard to the present disclosure.

From block 920, the process proceeds to block 930 and ends.

Therefore, based on the above, a sensing road user may sense the behavior of vehicles or other road users in its vicinity, or may detect other hazardous road conditions, and may provide reports if the behavior of the sensed road user falls outside of rules defined at the sensing road user. The reports may be sent either directly to other road users in the vicinity or may be sent to a server.

If the reports are sent to a server, the server may then compile the reports to provide a level of confidence with regard to the erratic behavior of the sensed road user. The server may then provide warnings or messages to others, including other road users or third parties such as the authorities or insurance companies.

If the reports are sent directly to other vehicles, the reports may include a blockchain or other history of events to allow the confidence level to be compiled by the receiving vehicle.

On receiving warnings, a road user may take action to avoid the erratic sensed vehicle, by providing a visual, auditory or tactile warning to a driver, and/or by controlling the vehicle to perform a positive maneuver such as pulling over or to restrict performance of a maneuver such as changing lanes. Other actions are possible.

The computing device associated with any network element such as a traffic management service, traffic management gateway, third party server, as well as a computing device on a vehicle or an RSU, may be any computing device. One simplified diagram of a computing device is shown with regard to FIG. 10.

Figure 10:
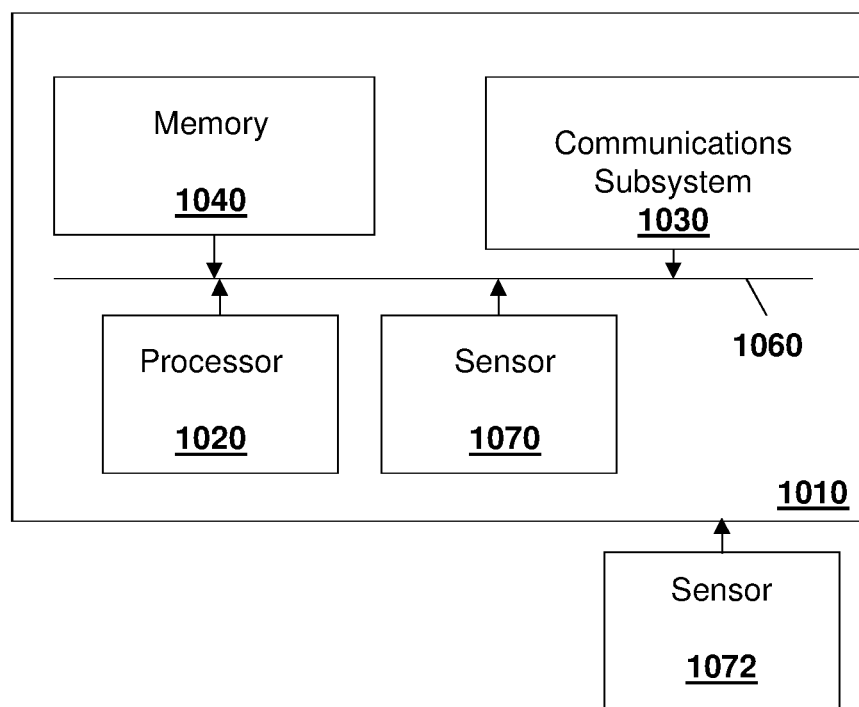
FIG. 10 is a block diagram of a simplified computing device capable of being used with the present embodiments.

In FIG. 10, computing device 1010 includes a processor 1020 and a communications subsystem 1030, where the processor 1020 and communications subsystem 1030 cooperate to perform the methods of the embodiments described above.

Communications subsystem 1030 allows computing device 1010 to communicate with other devices or network elements. Communications subsystem 1030 may use one or more of a variety of communications types, including but not limited to cellular, satellite, Bluetooth™, Bluetooth™ Low Energy, Wi-Fi, wireless local area network (WLAN), near field communications (NFC), IEEE 802.15, wired connections such as Ethernet or fiber, DSRC, among other options.

As such, a communications subsystem 1030 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 1030 will be dependent upon the communication network or communication technology on which the computing device is intended to operate.

Communications subsystem 1020 may, in some embodiments, comprise multiple subsystems, for example for different radio technologies.

Processor 1020 is configured to execute programmable logic, which may be stored, along with data, on device 1010, and shown in the example of FIG. 10 as memory 1040. Memory 1040 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1040, device 1010 may access data or programmable logic from an external storage medium, for example through communications subsystem 1030.

Communications between the various elements of device 1010 may be through an internal bus 1060 in one embodiment. However, other forms of communication are possible.

Internal sensors 1070 or external sensors 1072 may provide data to the computing device 1010. Such sensors may include positioning sensors, lidar, radar, image sensors such as cameras, orientation sensors, temperature sensors, vibration sensors, among other options.

The subject matter of the disclosure herein may also relate, among others, to the embodiments of the following clauses:

AA. A method at a computing device associated with a road user, the method comprising: detecting actions of a second road user; checking the actions against rules associated with the computing device; determining that the actions of the second road user contravene the rules; and providing a report regarding the actions of the second road user.

BB. The method of clause AA, wherein the actions include a speed of the second road user, and wherein the rules define a threshold speed above or below a speed limit that contravenes the rules.

CC. The method of clause AA or clause BB, wherein the actions include the second road user crossing a lane marker, and wherein the rules define a threshold number of times the second road user may cross the lane marker within a defined time period before contravening the rules.

DD. The method of any one of clauses AA to CC, wherein the actions include the second road user failing to obey a traffic signal and wherein the rules define compliance with traffic signals.

EE. The method of any one of clauses AA to DD, wherein the report is provided to a network server.

FF. The method of clause EE, wherein the report includes at least one of: identifying information about the second road user; video or pictures of the second road user; one or more rules contravened by the second road user; a location of the second road user; and a direction of travel of the second road user.

GG. The method of any one of clauses AA to FF, wherein the report is provided to a third road user within a geographic area proximate to the second road user.

HH. The method of clause GG, wherein the report is formed as a blockchain and includes previous reports received by the computing device associated with the road user in the blockchain.

II. The method of any one of clauses AA to HH, further comprising: receiving a hazard report; calculating a confidence level for the hazard report; and taking action based on the calculated confidence level.

JJ. The method of clause II, wherein the confidence level is calculated based the hazard report being a blockchain containing a plurality of reports therein.

KK. The method of any one of clauses AA to JJ, wherein the determining further comprises finding that no mitigating factors justify contravening the rules prior to providing the report.

LL. A computing device associated with a road user, the computing device comprising: a processor; and a communications subsystem, wherein the computing device is configured to: detect actions of a second road user; check the actions against rules associated with the computing device;

determine that the actions of the second road user contravene the rules; and provide a report regarding the actions of the second road user.

MM. The computing device of clause LL, wherein the actions include a speed of the second road user, and wherein the rules define a threshold speed above or below a speed limit that contravenes the rules.

NN. The computing device of clause LL or clause MM, wherein the actions include the second road user crossing a lane marker, and wherein the rules define a threshold number of times the second road user may cross the lane marker within a defined time period before contravening the rules.

OO. The computing device of any one of clauses LL to NN, wherein the actions include the second road user failing to obey a traffic signal and wherein the rules define compliance with traffic signals.

PP. The computing device of any one of clauses LL to OO, wherein the report is provided to a network server.

QQ. The computing device of clause PP, wherein the report includes at least one of: identifying information about the second road user; video or pictures of the second road user; one or more rules contravened by the second road user; a location of the second road user; and a direction of travel of the second road user.

RR. The computing device of any one of clauses LL to QQ, wherein the report is provided to a third road user within a geographic area proximate to the second road user.

SS. The computing device of clause RR, wherein the report is formed as a blockchain and includes previous reports received by the computing device associated with the road user in the blockchain.

TT. The computing device of any one of clauses LL to SS, wherein the computing device is further configured to: receive a hazard report; calculate a confidence level for the hazard report; and take action based on the calculated confidence level.

UU. The computing device of clause TT, wherein the confidence level is calculated based the hazard report being a blockchain containing a plurality of reports therein.

VV. The computing device of any one of clauses LL to UU, wherein the computing device is configured to determine by further finding that no mitigating factors justify contravening the rules prior to providing the report.

WW. A computer readable medium for storing instruction code which, when executed on a processor of a computing device associated with a road user cause the computing device to: detect actions of a second road user; check the actions against rules associated with the computing device; determine that the actions of the second road user contravene the rules; and provide a report regarding the actions of the second road user.

XX. The computer readable medium of clause WW, wherein the actions include a speed of the second road user, and wherein the rules define a threshold speed above or below a speed limit that contravenes the rules.

YY. The computer readable medium of clause WW or clause XX, wherein the actions include the second road user crossing a lane marker, and wherein the rules define a threshold number of times the second road user may cross the lane marker within a defined time period before contravening the rules.

ZZ. The computer readable medium of any one of clauses WW to YY, wherein the actions include the second road user failing to obey a traffic signal and wherein the rules define compliance with traffic signals.

AAA. The computer readable medium of any one of clauses WW to ZZ, wherein the report is provided to a network server.

BBB. The computer readable medium of clause AAA, wherein the report includes at least one of: identifying information about the second road user; video or pictures of the second road user; one or more rules contravened by the second road user; a location of the second road user; and a direction of travel of the second road user.

CCC. The computer readable medium of any one of clauses WW to BBB, wherein the report is provided to a third road user within a geographic area proximate to the second road user.

DDD. The computer readable medium of clause CCC, wherein the report is formed as a blockchain and includes previous reports received by the computing device associated with the road user in the blockchain.

EEE. The computer readable medium of any one of clauses WW to DDD, wherein the instructions further cause the computing device to: receive a hazard report; calculate a confidence level for the hazard report; and take action based on the calculated confidence level.

FFF. The computer readable medium of clause EEE, wherein the confidence level is calculated based the hazard report being a blockchain containing a plurality of reports therein.

GGG. The computer readable medium of any one of clauses WW to FFF, wherein instructions cause the computing device to determine by finding that no mitigating factors justify contravening the rules prior to providing the report.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, distributed, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device associated with a road user, the method comprising:
receiving a message from a second road user, the message comprising a blockchain with at least one block, each of the at least one block having a hash uniquely associated therewith, wherein the message includes a report on erratic behavior of a third road user, the report comprising a type of erratic behavior;
calculating a confidence level based on a number of road users reporting on the erratic behavior of the third road user;
selecting an action based on the type of erratic behavior; and
upon determining the confidence level is above a threshold, performing the action at the road user.

2. The method of claim 1, wherein the performing the action comprises at least one of: pulling over to the side of a road to allow the third road user to pass; changing lanes; avoiding changing lanes; or providing a warning.

3. The method of claim 1, wherein the performing the action comprises:
determining that the third road user is within a geographic distance threshold; and
forwarding the blockchain to a fourth road user.

4. The method of claim 1, wherein the performing the action comprises:
determining that the third road user is newer than a time threshold; and
forwarding the blockchain to a fourth road user.

5. The method of claim 1, wherein the performing the action comprises:
determining that the blockchain is smaller than a size threshold; and
forwarding the blockchain to a fourth road user.

6. The method of claim 1, further comprising:
observing and detecting actions of the third road user;
checking the actions against rules associated with the computing device;
determining that the actions of the third road user contravene the rules, the determining comprising:
assessing the actions to determine if there are any mitigating factors justifying contravening the rules;
upon finding no mitigating factor, updating the blockchain with a block regarding the actions of the third road user; and
forwarding the blockchain to a fourth road user or server.

7. The method of claim 6, wherein the updating the blockchain comprises appending the block regarding the actions of the third road user to the blockchain.

8. The method of claim 6, wherein the updating the blockchain comprises determining that the block regarding the actions of the third road user would increase the blockchain to a size larger than a threshold, and based on the determining, creating a new blockchain with the block.

9. A computing device associated with a road user, the computing device comprising:
a processor; and
a communications subsystem,
wherein the computing device is configured to:
receive a message from a second road user, the message comprising a blockchain with at least one block, each of the at least one block having a hash uniquely associated therewith, wherein the message includes a report on erratic behavior of a third road user, the report comprising a type of erratic behavior;
calculate a confidence level based on a number of road users reporting on the erratic behavior of the third road user;
select an action based on the type of erratic behavior; and
upon determining the confidence level is above a threshold, perform the action at the road user.

10. The computing device of claim 9, wherein the computing device is configured to perform the action by performing at least one of: pulling over to the side of a road to allow the third road user to pass; changing lanes; avoiding changing lanes; or providing a warning.

11. The computing device of claim 9, wherein the computing device is configured to perform the action by:
 determining that the third road user is within a geographic distance threshold; and
 forwarding the blockchain to a fourth road user.

12. The computing device of claim 9, wherein the computing device is configured to perform the action by:
 determining that the third road user is newer than a time threshold; and
 forwarding the blockchain to a fourth road user.

13. The computing device of claim 9, wherein the computing device is configured to perform the action by:
 determining that the blockchain is smaller than a size threshold; and
 forwarding the blockchain to a fourth road user.

14. The computing device of claim 9, wherein the computing device is further configured to:
 observe and detect actions of the third road user;
 check the actions against rules associated with the computing device;
 determine that the actions of the third road user contravene the rules by:
assessing the actions to determine if there are any mitigating factors justifying contravening the rules; and
 upon finding no mitigating factor, updating the blockchain with a block regarding the actions of the third road user; and
 forward the blockchain to a fourth road user or server.

15. The computing device of claim 14, wherein the computing device is configured for updating the blockchain by appending the block regarding the actions of the third road user to the blockchain.

16. The computing device of claim 14, wherein the computing device is configured for updating the blockchain by determining that the block regarding the actions of the third road user would increase the blockchain to a size larger than a threshold, and based on the determining, creating a new blockchain with the block.

17. A non-transitory computer readable medium for storing instruction code which, when executed on a processor of a computing device associated with a road user cause the computing device to:
 receive a message from a second road user, the message comprising a blockchain with at least one block, each of the at least one block having a hash uniquely associated therewith, wherein the message includes a report on erratic behavior of a third road user, the report comprising a type of erratic behavior;
 calculate a confidence level based on a number of road users reporting on the erratic behavior of the third road user;
 select an action based on the type of erratic behavior; and
 upon determining the confidence level is above a threshold, perform the action at the road user.

* * * * *